UNITED STATES PATENT OFFICE.

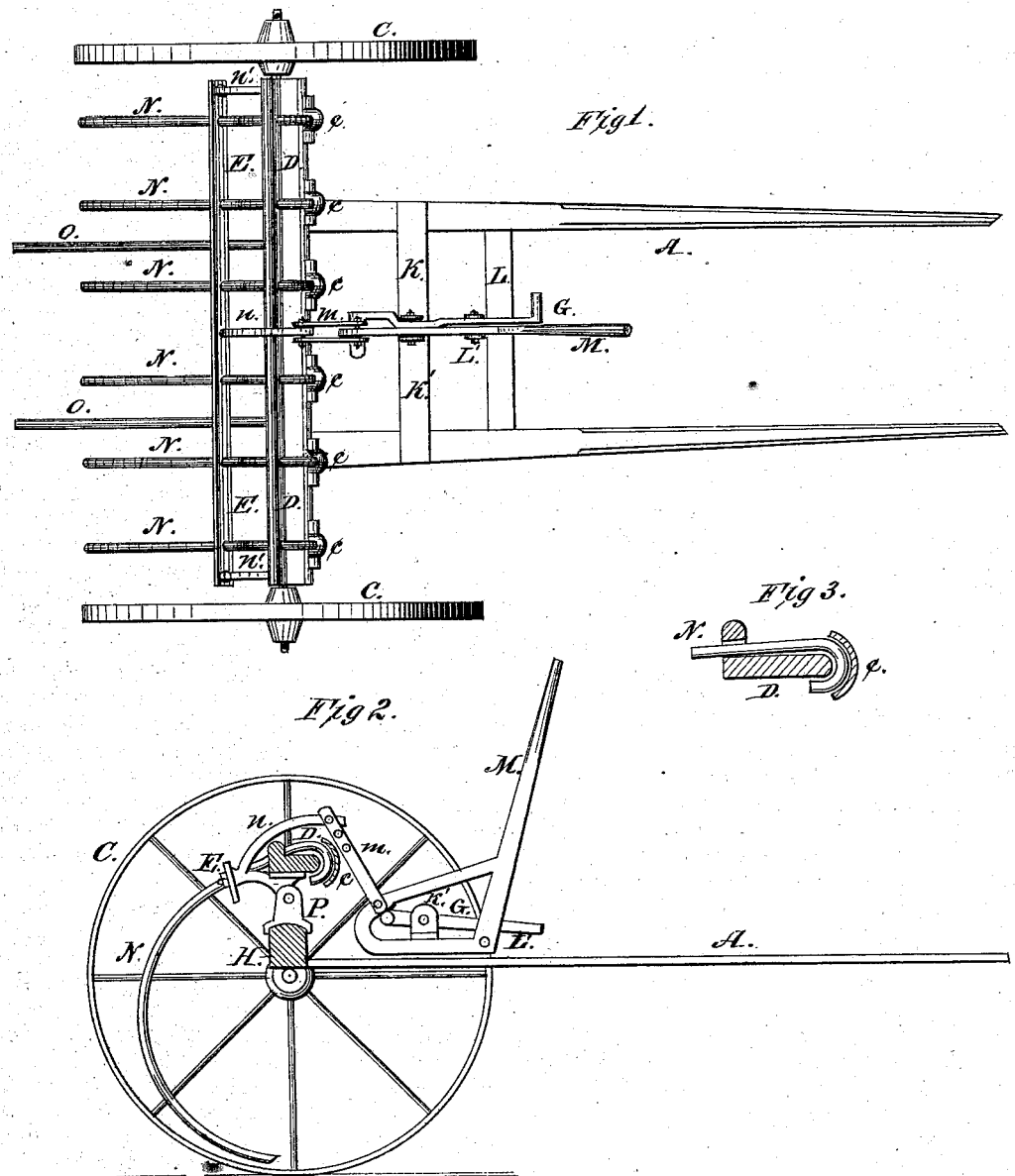

BENJAMIN OWEN, OF DAYTON, OHIO.

IMPROVEMENT IN HORSE HAY-RAKES.

Specification forming part of Letters Patent No. 159,349, dated February 2, 1875; application filed November 21, 1874.

*To all whom it may concern:*

Be it known that I, BENJAMIN OWEN, of Dayton, in the county of Montgomery and State of Ohio, have invented Improvements in Horse Hay-Rakes, of which the following is a specification:

My invention relates to a locking device for the purpose of holding the teeth in position while raking.

Figure 1 is a top view of the improved horse hay-rake. Fig. 2 is a plan of the same drawn at a right angle to the axle. Fig. 3 represents the manner of holding the tooth to the front bar of the rocking frame.

The improved horse hay-rake in its general features is not dissimilar to rakes in use. H represents the axle, which is mounted on wheels C. To the under side of the axle are fastened the shafts A, and on top of the axle are bolted three bearing-blocks, P, to which a like number of arms, n', are pivoted, which give support to the front bar, D, and the rear guide-bar, E. The central arm has a supplemental arm, n, which extends upward and over the front bar. This supplemental arm is connected by bars m to the hand-lever M. The shafts have two cross-bars connecting them. The bar K supports two ears, K', to which the foot-lever G is pivoted. The bar L supports the ears L', to which the hand-lever is pivoted. The form of the hand-lever is shown at Fig. 2. Two arms extend rearward and join in a curve, and to the upper end of the curve is jointed the bars m. The foot-lever G is shown in both Figs. 1 and 2. The front end has a projection for the foot, which is to the left, and the rear end has a projection to the right, which bears upon the inner surface of the hand-lever. In Fig. 2 this lever is shown in the position in which it is held by the foot to retain the teeth in contact with the surface of the ground. The bars m have a series of holes, and when the arm n is connected to one of the lower holes the teeth are somewhat elevated from the surface. The front bar, D, is composed of a horizontal and vertical part, and is shown in cross-section at Fig. 2. The front surface of the horizontal part is circular, and the vertical is perforated for the teeth to pass through. The orifices are round and only slightly larger than the diameter of the teeth. The teeth being thus held they can only have a slight vertical movement other than that given by the spring of the teeth. The rear bar, E, has a lengthened slot, which serves to hold the teeth in position laterally, and serves to check the upward movement of the teeth when heavily loaded. At Fig. 3 is shown the manner by which the tooth is held to the front bar. The clip c is curved to fit the front of the bar, and is secured to it by wood-screws passing through the ears into the bar. The clip has a circular orifice to receive the curved end of the tooth, the inner surface of the curve resting against the bar. Thus the tooth is held so as to admit of a slight vertical movement with scarcely any lateral play of the points of the teeth. At Fig. 2 is shown the relation of the tooth N to the other parts. From its fastening it passes through the vertical part of the bar, through the rear bar, and curves downward to near the ground. The vertical part of the front bar is not essential to the fastening of the tooth to the bar, and may be dispensed with so far as holding the tooth is concerned to this bar. O are cleaner-sticks, which are connected to the axle, and when the teeth are lifted up disengage the hay from the teeth. The operator is seated on a seat, not shown in the drawing.

The operation may be thus described: During the movement of the rake the driver places his foot firmly upon the foot-lever, which holds the teeth near the surface of the ground, and when the teeth are sufficiently filled he grasps the hand-lever, carrying it toward him. The teeth are elevated and the hay discharged. As the teeth fall back into position to do raking the lower part of the lever comes in contact with the cross-bar K and arrests the movement, and is there held by the foot-lever.

What I claim as my invention is—

The hand-lever M, having two arms joined at their outer ends, the upper of which serves as a bearing for the projecting end of the foot-lever G, and the lower comes in contact with the bar K of the shafts, to arrest the downward movement of the teeth where they are held by the foot-lever, as described.

BENJAMIN OWEN.

Witnesses:
 W. H. CLARK,
 B. PICKERING.